United States Patent [19]

Hewitt

[11] Patent Number: 4,481,701

[45] Date of Patent: Nov. 13, 1984

[54] CORED PLASTICS PROFILES AND MANUFACTURE OF FRAMES FOR WINDOWS AND THE LIKE THEREFROM

[76] Inventor: Michael J. Hewitt, 5 Hayling Crescent, Leicester, England, LE5 0RH

[21] Appl. No.: 534,976

[22] Filed: Sep. 15, 1983

Related U.S. Application Data

[62] Division of Ser. No. 253,502, Apr. 9, 1981, Pat. No. 4,420,920.

[30] Foreign Application Priority Data

| | | | |
|---|---|---|---|
| Aug. 29, 1979 | [GB] | United Kingdom | 7929902 |
| Jan. 11, 1980 | [GB] | United Kingdom | 8000926 |
| Jun. 24, 1980 | [GB] | United Kingdom | 8018338 |

[51] Int. Cl.[3] .......................... B29C 17/08; B23P 17/00

[52] U.S. Cl. .......................................... 29/416; 29/451; 29/453; 29/458; 264/135; 264/149; 264/152; 264/156; 264/172; 264/177 R; 425/113

[58] Field of Search ............... 264/135, 149, 150, 152, 264/155, 162, 171, 172, 174, 177 R, 156; 425/113; 29/416, 417, 458

[56] References Cited

U.S. PATENT DOCUMENTS

| | | | |
|---|---|---|---|
| 2,926,729 | 3/1960 | Zanini | 264/149 |
| 2,950,790 | 8/1960 | Haas, Jr. | 29/458 |
| 3,088,166 | 5/1963 | Colombo | 425/113 |
| 3,189,136 | 6/1965 | Stickney | 29/416 |
| 3,380,145 | 4/1968 | Stroud et al. | 29/417 |
| 3,441,995 | 5/1969 | Revell et al. | 29/416 |
| 3,470,598 | 10/1969 | Berthelsen | 29/417 |
| 3,725,995 | 4/1973 | Sharp et al. | 29/458 |
| 3,753,285 | 8/1973 | Gewertz | 29/416 |
| 3,825,459 | 7/1974 | Taylor | 264/177 R |
| 3,992,769 | 11/1976 | Jackson | 29/416 |
| 4,062,919 | 12/1977 | Rojahn et al. | 264/150 |
| 4,096,678 | 6/1978 | Diels et al. | 29/416 |
| 4,130,976 | 12/1978 | Kesseler et al. | 29/416 |
| 4,281,492 | 8/1981 | Schock et al. | 264/171 |

FOREIGN PATENT DOCUMENTS

| | | | |
|---|---|---|---|
| 2451737 | 6/1975 | Fed. Rep. of Germany | 264/174 |
| 2619983 | 11/1976 | Fed. Rep. of Germany | 264/171 |
| 2370567 | 11/1977 | France | 264/152 |
| 0118630 | 5/1971 | Japan | 264/177 R |

*Primary Examiner*—Jeffery Thurlow
*Assistant Examiner*—Patrick Dailey
*Attorney, Agent, or Firm*—Vincent A. White; Donald N. Halgren

[57] ABSTRACT

A profile for use in the manufacture of frames for windows and the like comprises a core (1) of generally rectangular cross section of laminated plywood or cement-bonded fibrous material with a cladding (3) of plastics material, for example polyvinylchloride or polycarbonate, extruded therearound. The extruded cladding (3) provides, extending along the length of the profile, a glass (or other) panel retaining member (9) which is inclined inwardly (preferably at 45° or substantially so) over a surface of the profile, and an undercut rib 11 spaced from the member (9). In manufacturing frames from the profile the latter is cut into appropriate lengths by saw cuts (31-39) extending at 45° across the profile, alternate ones of the frame members being assembled to form inner (40) and outer (42) frames for a window or the like, the panel retaining members (9) being severed from the outer frame members and used as glazing strips (9'0 for the inner frame members, being supported by the undercut face (23) of the rib (11) and a glazing clip (100) supported by said surface of the profile. An alternative form of glazing clip (47) is described. The frame members are secured together at the frame corners by means of plastics material injected into cavities (207) formed through adjacent faces (205) of the frame members and provided with metallic reinforcements (211).

15 Claims, 19 Drawing Figures

CORED PLASTICS PROFILES AND MANUFACTURE OF FRAMES FOR WINDOWS AND THE LIKE THEREFROM

This application is a divisional of Ser. No. 253,502 Apr. 9, 1981 now U.S. Pat. No. 4,420,920.

TECHNICAL FIELD

This invention is concerned with cored extruded plastics profiles, suitable for use in the manufacture of frames for windows and the like, comprising a core of shape-retaining material and a cladding of plastics material extruded therearound. The invention is also concerned with methods of manufacturing frames for windows or the like from such profiles, including methods of forming the corner joints of said frames, and with glazing clips particularly suitable for use in assembling glass or other panels in said frames.

BACKGROUND ART

Frames for windows and the like have traditionally been made from wood, and the manufacturing process has often involved fairly complex machining operations both in providing the frame members with the desired profile and in forming the corner joints of the frames. These machining operations result in a considerable wastage of material. Furthermore wooden frames require frequent painting to avoid rapid deterioration from exposure to the weather.

As an alternative to wood, it is also well-known to manufacture frames for windows and the like from aluminium, which may be extruded to provide suitable profiles, usually of complex cross-sectional shape, which may be cut into frame members of the desired length and assembled by means appropriate corner joint arrangements to provide the required frames. While such frames of aluminium are likely to require less maintenance than frames made from wood, the aluminium frames result in a considerably greater transmission of heat unless the profiles incorporate some form of heat barrier, which further increases the complexity of the profile.

In the interests of ease of manufacture, avoidance of wastage of materials, economy and providing a virtually maintenance-free product it has been proposed to construct frames for windows and the like from wooden frame members of simple cross section (e.g. rectangular) having cladding portions at least partially enclosing the wooden frame members, which cladding portions are conveniently made by extrusion of plastics material and are shaped to perform the necessary sealing, weather resisting and interconnecting roles of the frame. Such cladding can be pre-coloured to perform any decorative function and is virtually maintenance free. The specification of my United Kingdom patent application No. 7924197 (published under No. 2026125 on Jan. 30, 1980) relates to the formation of corner joints between frame members and shows, in FIGS. 3 and 7 of the drawings thereof, a cross-section of a frame member (as just above referred to) having a wooden core with a cladding of plastics material extruded therearound for use in the construction of a window frame. The corner joints as disclosed in said specification are made by injecting plastics material into communicating cavities formed in abutting portions of the frame members, the plastics material being reinforced by metal inserts if desired.

It is an object of the present invention to achieve further economies and ease in the manufacture of frames for windows and the like with substantially no wastage of materials by providing a cored extruded plastics profile which is so formed and shaped that, not only can it be manufactured very economically, to very close dimensional tolerances, and with virtually no wastage of material, but, with very simple operations performed thereon, can be used to assemble both an outer, static, frame and an inner, opening frame of a frame assembly for a window or the like which may be fitted with glass or other panel material and readily interconnected by hinge mechanism or the like.

DISCLOSURE OF INVENTION

According to the invention the cored extruded plastics profile is characterized in that the core is of generally rectangular cross sectional shape and in that the cladding provides (a) along one surface of the profile at a locality adjacent one edge of that surface a retaining member for a panel of glass or other suitable material, which retaining member extends inwardly over said surface and is inclined at an angle thereto and (b) along said surface of the profile, at a locality spaced from the retaining member, a rib having an undercut face inclined to said surface at an angle at least substantially corresponding to the angle of inclination of the retaining member, whereby, in the manufacture of inner and outer frames for windows or the like from said profile, the retaining member may be cut from frame members which are to form the outer frame and utilised as glazing strips in the manufacture of the corresponding inner frame, the glazing strips being arranged, after the insertion of a glass or other panel, to abut against the undercut face of the rib of the profile and to be supported by supporting members mounted on said surface of the profile.

In the manufacture of a cored extruded plastics profile in accordance with the invention the core may comprise any suitable material providing the necessary strength and shape-retaining stability. Preferred materials for the core are a good quality laminated plywood or, alternatively, a cement-bonded fibrous material such as cement-bonded chipboard or cement-bonded glass fibres. Furthermore the cladding may be of any suitable plastics material capable of being extruded around the core and of providing adequate strength to the glass or other panel-retaining member and the desired durability under adverse weather conditions. Preferred materials for the cladding are appropriate grades of polyvinylchloride or polycarbonates.

A profile in accordance with the invention may conveniently be made by feeding a continuous length of core material through a plastics extruding machine having accurately made dies which impart the desired shape and dimensions to the cladding of the profile. It is preferred to pass the core material, prior to its passage through the plastics extrusion machine, through a coating machine which is organised to coat the faces of the core material with a layer of hot melt adhesive which serves to fill any pores or small cavities in the core material with a view to avoiding difficulties in the plastics extrusion process which might otherwise occur by reason of expansion of gas (air) in the pores or cavities resulting in blemishes in the cladding. Preferably the coating machine comprises scraper or doctor blades arranged to control the thickness of the hot melt coating so that the coated core material is built up to a prescribed accurate dimensional form ready to enter the dies of the plastics extrusion machine.

In the manufacture of a profile in accordance with the invention, the dies of the plastics extrusion machine are preferably so shaped as to provide the profile, along a second surface thereof (which is parallel with the surface from which extends the panel retaining member) with flange means extending normally to said second surface and adapted, when the profile is assembled into said inner and outer frames, to provide a weather proofing facility.

In a profile in accordance with the invention it is anticipated that an adequate panel-retaining facility will be provided if the panel-retaining member is inclined to the first mentioned surface of the profile at an angle within the range of from about 30° to about 60°. Conveniently the angle is 45°.

A method of manufacturing frames for windows or the like from a cored extruded plastics profile in accordance with the invention preferably comprises the steps of feeding an indefinite length of the profile past sawing means organised to make a series of transverse cuts at 45° across the profile so as to sever therefrom successively frame members of appropriate lengths for assembly alternately into an outer, static, frame and an inner opening, frame for a window or the like, severing the glass or other panel-retaining members from those frame members which are to be assembled into the outer frame, assembling the alternate members to form said inner frame and said outer frame, and, after cutting the retaining members severed from the frame members for the outer frame to appropriate lengths, utilizing them as glazing strips in assembling said inner frame with a glass, or other, panel. The glazing strips are arranged to abut against the undercut face of the rib of the profile and to be supported by supporting members mounted on the first-mentioned surface of the profile, said supporting members preferably being provided by glazing clips each comprising a base portion adapted to be secured to said surface of the profile, a first panel-abutting portion arranged to extend at least substantially perpendicular to the base portion for engagement with one side of the panel and a second panel-abutting portion which extends from an end portion of the base portion inwardly thereover for engagement with the other side of said panel, said second panel-abutting portion providing a supporting surface for the glazing strip, the glazing strip being conveniently secured thereto by means of pressure-sensitive adhesive provided on said supporting surface. Conveniently the glazing strips are formed of extruded plastics material such as polythene, polyethylene, polypropylene or polycarbonate. Preferably the glazing clips are so constructed that a mid portion of the base portion is provided with inclined, stepped, wedge faces which are adapted to lie adjacent to an edge face of the glass, or other, panel and are arranged to co-operate with wedge members having complementary stepped wedge faces which may be driven between said edge of the panel and the stepped wedge faces of the glazing clips to support the panel at a desired position with respect to the profile.

In a slightly modified form of profile also in accordance with the invention an inner end portion of the panel-retaining member is provided with a rib portion which extends towards the first-mentioned surface of the profile (over which the panel-retaining member extends) and terminates in a substantially cylindrical bead spaced from that surface, and profile also includes an intermediate rib which extends along said surface at a locality between the panel-retaining member and the first-mentioned rib, said intermediate rib having undercut inclined faces at its opposite sides. In using the slightly modified form of profile in the construction of frames for windows and the like the glazing strips are arranged, after insertion of a glass or other panel, to abut against the undercut face of the first-mentioned rib of the profile and to be supported by glazing clips each of which comprises a pair of leg portions adapted to clip over the undercut faces of the intermediate rib and a pair of arm portions providing between them a semi-cylindrical recess adapted to clip around the bead of the glazing strip.

In the manufacture of frames from a profile in accordance with the invention the corners are preferably made by utilizing corner joints which are made by injecting plastics material into communicating cavities formed in abutting portions of the frame members, the corner joints being of improved construction as compared with those disclosed in my U.K. patent application No. 2026125 above referred to. It will be appreciated that when a length of the profile is cut, as hereinbefore referred to, by said transverse cuts to provide the several frame members, the cuts provide the frame members with inclined end faces which, in forming a corner joint between two adjacent frame members, are brought into abutting relationship. The preferred form of corner joint is made by drilling two series of at least substantially parallel bores through the inclined end faces of the frame members, the bores in each series being arranged to overlap, to provide a pair of slot-like cavities having walls with ridges extending into each frame member through its inclined end face. The two series of bores are drilled at such localities that the cavities of each pair of cavities are spaced apart in a direction extending widthwise of the respective frame members, and the lengthwise direction of each slot-like cavity lies at least substantially parallel to a plane containing the two assembled frame members, the cavities being so located that a cavity in one frame member communicates with the corresponding cavity in the other frame member when the frame members are held in abutting relationship. During the assembly of the frame members there is introduced, into each pair of communicating cavities, a plate-like reinforcing member having a plurality of apertures extending therethrough, and, while the frame members are firmly held in assembly position, a settable plastics material is injected into said cavities at least substantially to fill those cavities and enter the apertures in the reinforcing member therein, so as to provide, on setting of the plastics material, a bridging member extending from a cavity in one frame member to the corresponding cavity in the adjacent frame member so as to secure the frame members together. Conveniently the reinforcing members are formed from expanded metal sheet material. It will be appreciated that the ridged walls of the cavities and the apertures in the reinforcing member placed therein provide means with which the plastics material keys on setting, thus providing a good anchorage for the components forming the joint. Preferably the bores providing each cavity are arranged to extend into the associated frame member in a direction inclined to a normal to its end face, for example at an angle in the range of from about 10° to about 30°. The ridges provided by the overlapping bores do not then extend parallel to the lengthwise direction of the frame member, thus resisting further the withdrawal of the reinforced plastics material from the cavity in which it is formed. Where the profile for the frame members is made of relatively heavy material (such as the cement-bound cored profile hereinbefore referred to), the corner joints may be further strengthened and rendered very resistant to breaking open by providing, in each of two frame members associated with a joint, an additional cavity extending through the inclined end face in a direction lengthwise of the frame member so that, when the frame members are assembled, these lengthwise extending cavities communicate. In assembling the components forming the joint, an L-shaped reinforcing member, of less cross-sectional area than the cavities, is placed therein, plastics material then being injected into the additional cavities. Conveniently the L-shaped reinforcing member is in the form of a rod provided with surface indentations to provide a key for the plastics material. The plastics material may be conveniently injected into all the cavities at one joint simultaneously through a bore in one end at least of the frame members communicating with each cavity, the bore preferably extending through an inside face of one of the frame members.

While, in forming corner joints as described in the last preceding paragraph, any suitable plastics material which is capable of being rendered fluent for injection into the cavities of the joint and then sets to provide, with the reinforcing member, a strong corner joint bridging member may be used, a particularly suitable material comprises nylon.

It will be appreciated that, in forming joints between adjacent frame members in the manner just above described in which the cavities in the end portions of the adjacent frame members are formed by drilling through the inclined end faces of the frame members, it can be assured that the cavities do not break through outer surfaces of the frame members and are thus completely hidden in the completed joint.

From what has been said hereinbefore it will be appreciated that cored extruded plastics profiles in accordance with the invention may readily be constructed in a continuous, indefinite, length by a series of relatively simple machines and that the form of the profile is such that it can be economically manufactured from readily available materials with substantially no waste. Furthermore, frames for windows and the like can readily be constructed from such profiles by the use of a series of relatively simple machines in such manner that there is virtually no wastage of material. The resultant frames are likely to be strong, of relatively simple construction, durable against deterioration due to atmospheric conditions and to be of low thermal conductivity, particularly when double glazed panels are assembled therein. Such frames are likely to be very economical to manufacture, particularly since it is anticipated that the several machines needed for the manufacture of the profile, and for the manufacture of frames therefrom will be capable of being arranged in a production line, the machines being automatically controlled by a computer.

There will now be given, with reference to the accompanying drawings, a more detailed description of a cored extruded plastics profile (which will be described first in one form and then in a slightly modified form) in accordance with the invention, a method of manufacturing the profile, a method of constructing frames for windows or the like therefrom, and glazing clips suitable for use in assembling the frames all in accordance with the invention. It will be understood that the profile, the method of its manufacture, the method of constructing frames therefrom, and the glazing clips have been selected for description by way of illustration of the invention and not by way of limitation.

BEST MODE OF CARRYING OUT THE INVENTION

Figure 1:
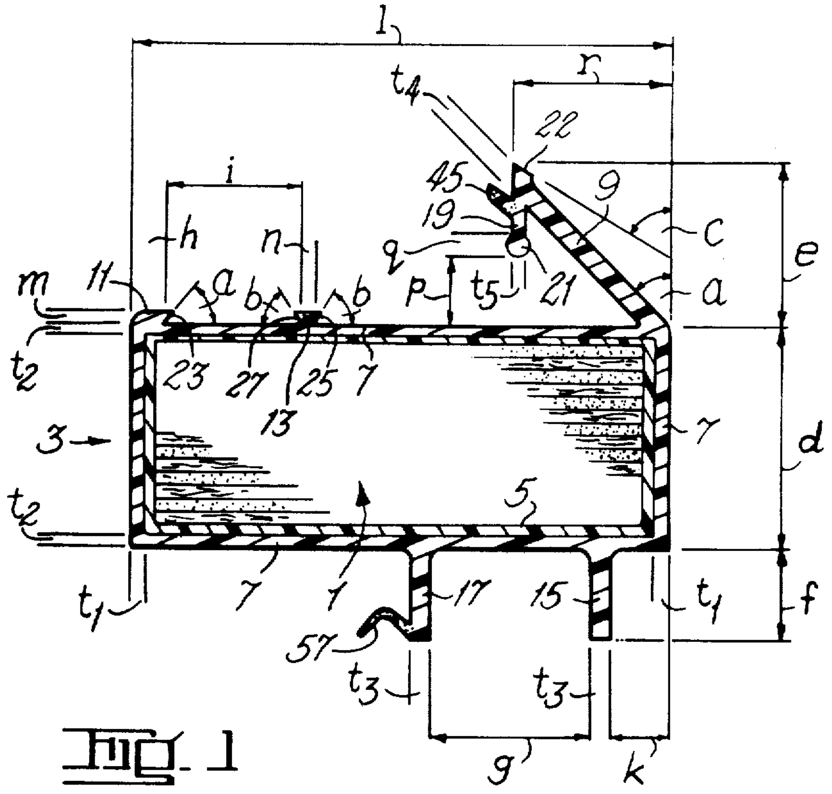
FIG. 1 is a transverse section of a first form of the illustrative profile, the profile being a cored extrusion of indefinite length.

The illustrative profile shown in FIG. 1 is a cored extruded plastics profile suitable for use in the manufacture of frames for windows and the like. It comprises a core 1 of shape retaining material within a cladding 3 of extruded plastics material. The profile can be readily manufactured by a continuous extruding process and cut into lengths to provide frame members for windows and the like in the manner hereinafter described. In the interests of economy, avoidance of waste, and ease of manufacture, the cross sectional shape of the core is kept simple, and is generally rectangular as shown in FIG. 1. The core provides the structure with the desired strength while the plastic cladding provides an at least substantially maintenance-free protective surface and is formed and shaped, as hereinafter described, to perform a panel (e.g. glass) retaining function and other functions such as weather proofing to be mentioned hereinafter.

As shown in FIG. 1 the core 1 is of laminated form and preferably comprises a good quality plywood giving a high degree of dimensional stability, freedom from warping, and, by means of multi-tongued joints, a facility for easily joining successive lengths of core material into a continuous length for feeding into the necessary machinery by which the plastics cladding is extruded around the core. However, the core may comprise any suitable material having the necessary structural and dimension retaining properties outlined hereinbefore. Particularly suitable materials are cement-bound fibrous materials such as cement-bound chipboard or cement-bound glass fibres which, like the plywood, can be produced as sheets of appropriate thickness which sheets may readily be cut into the lengths of the desired width, using multiple sawing machines of known type. The lengths of core material may then be joined together by means of appropriate joints to form a core of indefinite length ready for feeding into the plastics extruding machinery.

Before the plastics cladding is extruded around the core it is desirable to pass the core through a coating machine which coats all the faces of the core with a layer of hot-melt adhesive material, such layer being indicated by the reference numeral 5 in FIG. 1 (the thickness of the hot-melt layer being somewhat exaggerated in that Figure). The layer 5 of hot-melt adhesive material serves to fill any pores, small cavities and the like in the core with a view to avoiding difficulties in the plastics extrusion process which might otherwise occur by reason of expansion of gas (air) in the pores or cavities resulting in blemishes in cladding. By the use of coating machinery having scraper or doctor blades of the appropriate type the coating process can be so controlled that the coated core is built up to a prescribed accurate dimensional form on leaving the coating machine ready to enter the extrustion machinery by which the plastics cladding is applied. As an example of a suitable hot-melt adhesive for the core-coating process just described may be mentioned hot-melts sold under the name Eastobond by Eastman Chemical Products Inc., but it will be understood that other, generally similar, products may be used.

During the cladding process the plastics material is extruded by means of known machinery on to the core together with a further layer of hot-melt adhesive which assists in bonding the cladding material to the core. During the extrusion process the core and cladding are extruded through accurately made dies which impart the desired shape and dimensions to the finished profile.

It is be understood that any plastics material may be used for the cladding 3 but, by way of example, appropriate grades of Polyvinylchloride and Polycarbonates may be mentioned as being suitable.

The dies of the plastics cladding extrusion machine are so shaped that the extruded profile, in addition to providing a wall 7 covering the whole of the core, provides also a glass, or other, panel retaining member 9 along one edge portion (hereinafter referred to as the outer edge portion) of the upper surface of the profile as viewed in FIG. 1, an inner rib 11 along the other edge portion of said upper surface, an intermediate rib 13 extending along an intermediate portion of said surface as shown in FIG. 1, and two flanges 15, 17 extending normally to the lower parallel surface of the profile as seen in that figure. The flanges 15, 17 are adapted to provide a weather proofing facility as will become clear hereinafter. These several members and flanges extend throughout the length of the profile.

The panel retaining member 9 is inclined inwardly from the outer edge portion of the upper surface of the profile at an angle a and from its inner end portion there extends a depending rib 19 terminating in a substantially cylindrical bead 21, the rib 19 extending at least substantially perpendicularly to the upper surface of the cladding (as seen in FIG. 1). The member 9 at its upper end portion has a small upwardly extending portion terminating in a surface 22 inclined at an angle c to the normal to the upper surface of the extrusion as seen in FIG. 1, the angle c being conveniently 60° (or substantially so) for a purpose hereinafter referred to.

The inner rib 11 is under cut as shown in FIG. 1 to provide a supporting face 23 making an angle a to the upper surface of the profile. The intermediate rib 13 is undercut at both sides at angles b to provide inclined surfaces 25, 27 for a purpose hereinafter described.

Figure 2:
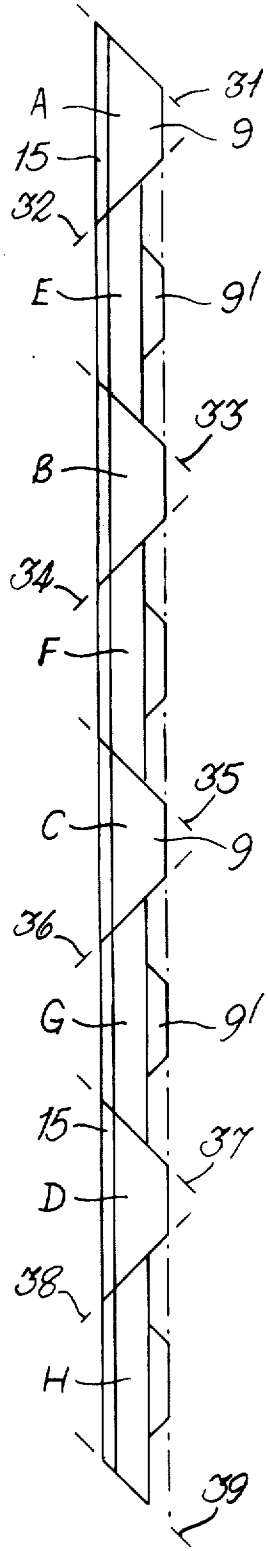
FIG. 2 is a diagrammatic representation of how the illustrative profile may be cut, by means of a series of 45° cuts, into members of lengths suitable for use in constructing a window frame comprising an outer, static, frame and an inner, opening, glass-supporting frame.
Figure 3:
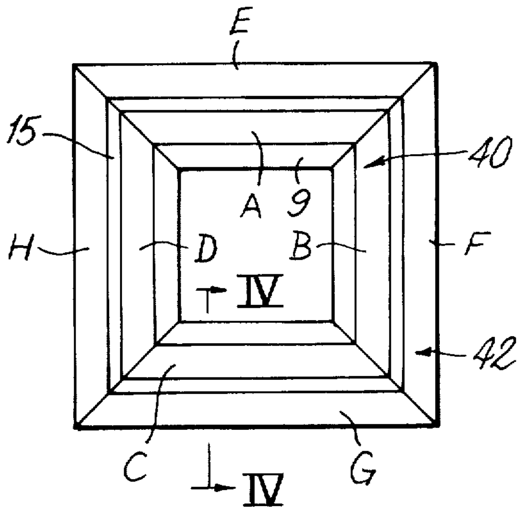
FIG. 3 is a diagrammatic representation showing how the various members indicated in FIG. 2 are assembled into such a window frame.

Before indicating preferred values for various dimensions of the profile, the way in which it may be cut and assembled into a window (or like) frame will now be indicated with particular reference to FIGS. 2 and 3. An indefinite length of profile may be fed past sawing means organised to make a series of transverse saw cuts (indicated at 31,32,33,34,35,36,37,38 and 39 in FIG. 2) at 45° across the profile, so as to sever therefrom successively frame members A,E,B,F,C,G,D,H of appropriate lengths for assembly alternately into an outer, static, frame and an inner, opening, frame for a window or the like. Thus, the frame members A,B,C,D indicated in FIG. 2 may be assembled to provide the inner, opening, frame 40 of a window frame as shown in FIG. 3. The panel retaining member 9 is then severed from the frame members E,F,G,H by a saw cut extending parallel and close to the adjacent surface of the cladding as indicated by the dotted line 41 in FIG. 4 and these frame members are then assembled to form said outer, static, frame 42 as shown in FIG. 3. Preferably the ribs 11 and 13 will have also been removed from those frame members by similar saw cuts to provide a reasonably smooth surface to the outside of the static frame 42 ready for insertion into an aperture in a wall of a building.

Figure 5:
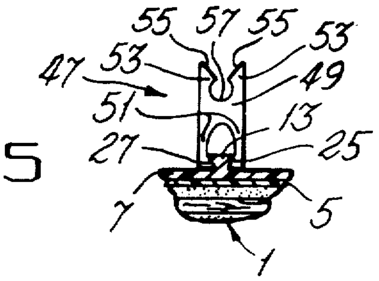
FIG. 5 is an end view of a glazing clip used in producing the window frame shown in FIG. 4.
Figure 4:
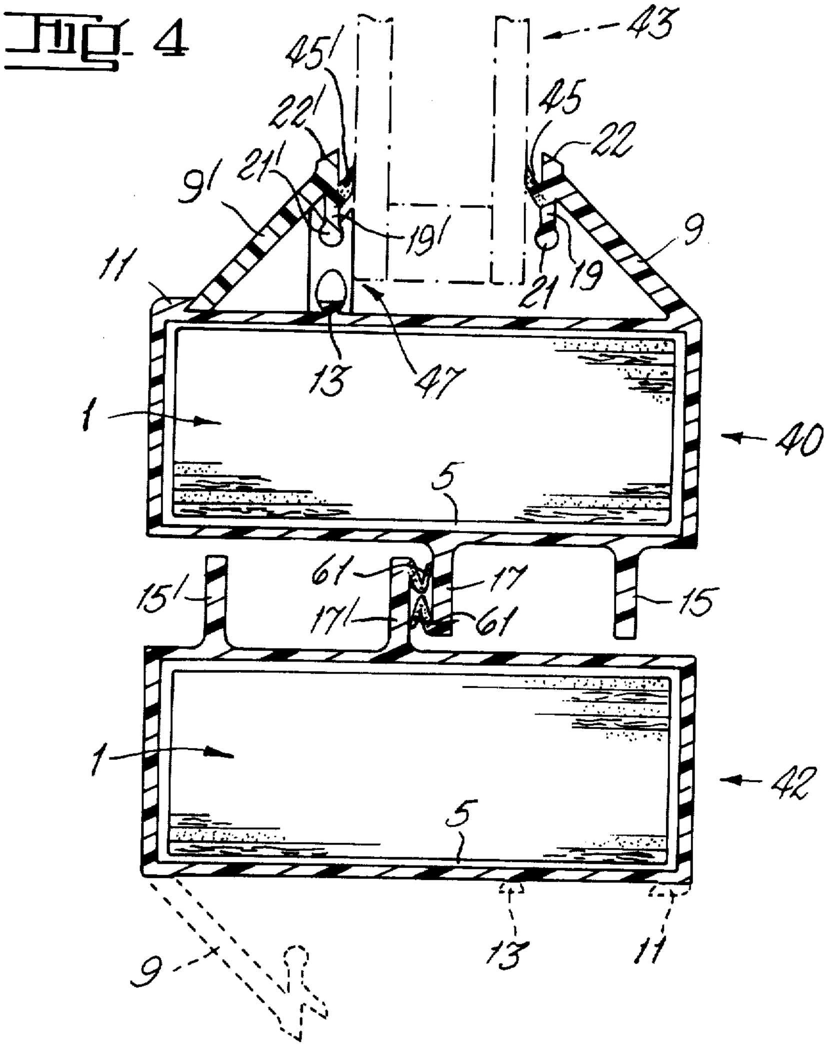
FIG. 4 is a transverse sectional view, taken on the line IV—IV in FIG. 3, of adjacent portions of the outer frame and inner frame of such a window frame, in closed position.

In FIG. 4 a portion of a sealed double glazed panel is indicated in phantom by the reference numeral 43. It is supported between the retaining member 9, which has a sealing strip 45, conveniently of flexible PVC, attached to the depending rib 19 at the outside of the glass and, at the inside, a glazing strip 9' provided by material of the retaining member 9 which has been severed from the frame members for the outer frame 42 and cut to appropriate length. The glazing strip 9' is arranged to abut against the undercut face 23 of the rib 11 and is retained in position by being supported by supporting members mounted on the upper surface of the profile as seen in FIG. 4. The supporting members comprise a series of glazing clips 47 (one of which is shown in FIG. 5) placed at intervals along the intermediate rib 13. The glazing clips 47 are shaped as shown in FIG. 5 and are conveniently made of nylon, the length perpendicular to the plane of the drawing of each clip being of the order of 20 mm. As shown in FIG. 5 each clip comprises a body portion 49 having a pair of depending leg portions 51 having inwardly directed toe portions with inclined surfaces complementary to the surfaces 25, 27 of the intermediate ribs 13 of the profile. The glazing clip also comprises a pair of arm portions 53 extending upwardly from the body portion and provided with a semicylindrical recess 57 commensurate with the diameter of the bead 21 of the depending rib 19 of the panel retaining member 9 of the profile. The inner sides of the arms include inclined faces 55 leading to the recess 57. The dimensions of the glazing clip are such that, by squeezing together the arm portions 53, the leg portions 51 may be separated and clipped over the intermediate rib 13 of the profile, conveniently at about 200 mm intervals therealong. Then, with the glass panel in place, the glazing strip (indicated by the reference 9' in FIG. 4) is inserted by tucking it under the face 23 of the inner rib 11 and pressing its upper portion downwardly so that the bead 21' of the depending rib 19' is forced between the inclined surfaces 55 of the arm portions 53 into the recesses 57 in which the bead is then firmly held. When the glazing strip 9' has been so inserted, it is preferable that an upper end portion of the adjacent arm portion 53 of each glazing clip engages the inner side of the glazing strip to help hold the parts firmly in place. Beads of silicone 59 inserted between the glass panel and the retaining member 9 and glazing strip 9' seal the system against the ingress of dirt and moisture. The inclined surface 22 (FIG. 1) reduces any risk of contaminating the main face of the portion 9 when trimming the silicone bead.

When the window frame arrangement is to support a double glazed unit comprising two sheets of 4 mm glass sealed with a gap of 12 mm (thus presenting an overall thickness of 20 mm) convenient values for the various dimensions indicated in FIG. 1 by identifying letters are given in the following table:

| letter | Description | mm |
|---|---|---|
| d | depth of body of profile | 27.0 |
| e | height of member 9 | 20.0 |
| f | depth of flanges 15, 17 | 11.0 |
| g | spacing between flanges 15, 17 | 20.0 |
| h | width of base of rib 11 | 4.0 |
| i | spacing between roots of surfaces 23, 25 | 17.0 |
| k | inward spacing of flange 15 | 7.0 |
| l | overall width of profile | 67.0 |
| m | depth of ribs 11, 13 | 1.5 |
| n | thickness of root of rib 13 | 1.5 |
| p | spacing of bead 21 from top surface | 8.5 |
| q | diameter of bead 21 | 2.5 |
| r | projected width of member 9 | 19.0 |
| $t_1$ | thickness of side walls of cladding | 1.0 |
| $t_2$ | thickness of top and bottom walls | 0.5 |
| $t_3$ | thickness of flanges 15, 17 | 2.5 |
| $t_4$ | thickness of member 9 | 2.5 |
| $t_5$ | thickness of depending rib 19 | 1.5 |

In a profile having the dimensions given in the above table the angle a (inclination of the panel retaining member 9, and the corresponding inclination of the undercut face 23 of the rib 11) as shown in FIG. 1 is 45° or substantially so. However, with appropriate changes in certain dimensions of the profile, it is anticipated that the angle could be within a range of from about 30° to about 60° while still providing an adequate panel retaining facility. Conveniently the angles b and c may both be of the order of 60° but it will be understood that these angles are not particularly critical.

Figure 6:
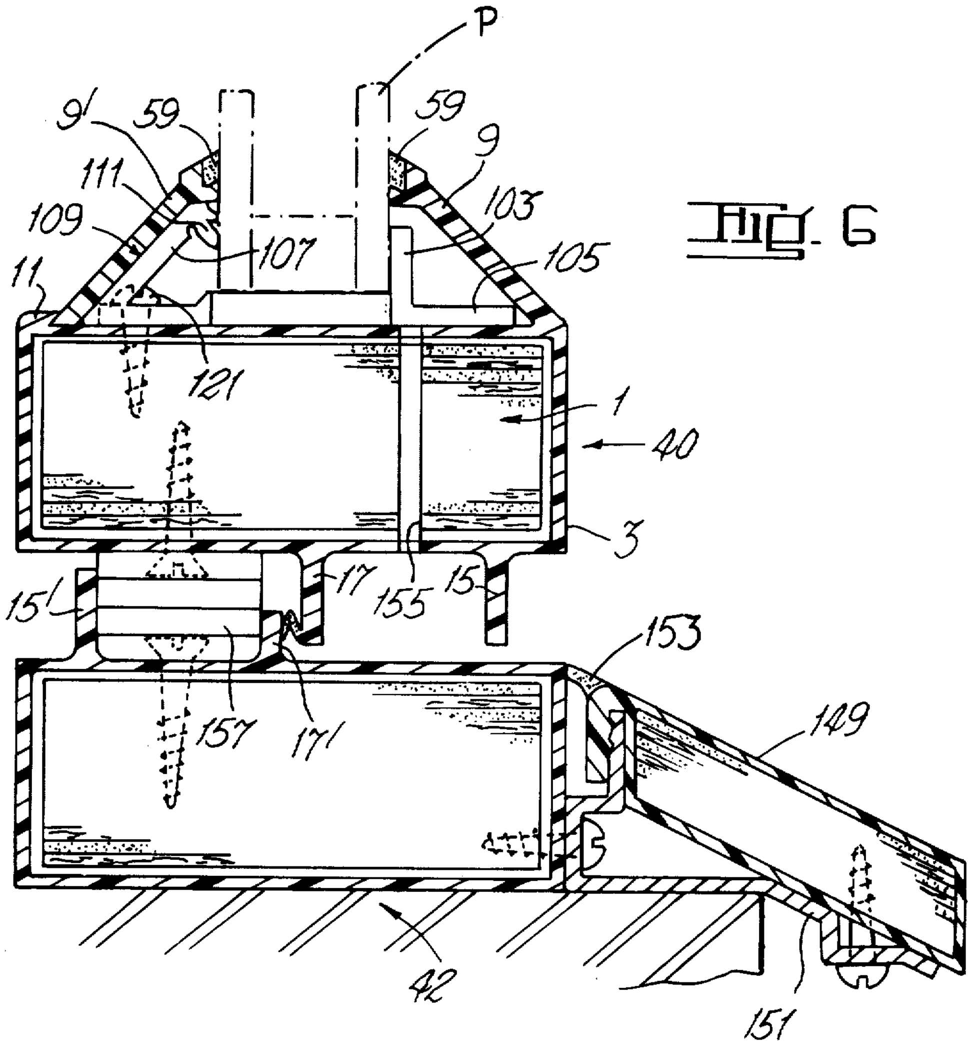
FIG. 6 is a transverse sectional view of adjacent portions of the outer frame and inner frame of a window frame generally similar to that shown in FIG. 4 but incorporating a slightly different form of the illustrative profile and using a different form of glazing clip.

The window frame assembly adjacent portions of inner and outer frames of which are shown in cross section in FIG. 6 is made from a cored extruded plastics profile which is generally similar to that hereinbefore described with reference to FIG. 1 but is modified in certain details as will now be explained. The profile thus comprises a core 1 with a plastics cladding 3 of extruded plastics material which also provides a glass, or other, panel retaining member 9 inclined inwardly at an angle of 45° (or substantially so) from an outer edge of the upper surface of the profile (as viewed in FIG. 6) and an inner rib 11, having an undercut face, along an inner edge portion of said upper surface of the extrusion. The profile shown in FIG. 6 also includes flanges 15 and 17 generally similar to those of the profile shown in FIG. 1. However the retaining member 9 does not include a depending rib and bead such as the rib 19 and bead 21 of the profile shown in FIG. 1. Neither does the upper surface of the profile shown in FIG. 6 include an intermediate rib such as the rib 13 of the profile shown in FIG. 1.

The method of cutting and assembling the frame members of the frame assembly shown in FIG. 6 is generally similar to that hereinbefore described with reference to FIGS. 2, 3, and 4 except that, while the glazing strips 9' (severed from the outer frame members as hereinbefore described) are supported in abutting relationship with the undercut face of the rib 11 of the inner frame members, they are supported by supporting members provided by glazing clips 100 of different construction from those hereinbefore described.

Figure 7:
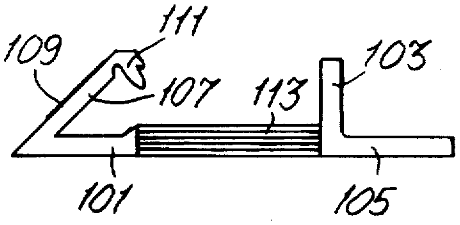
FIG. 7 is a side view of a glazing clip as used in constructing a window frame in accordance with FIG. 6.
Figure 8:
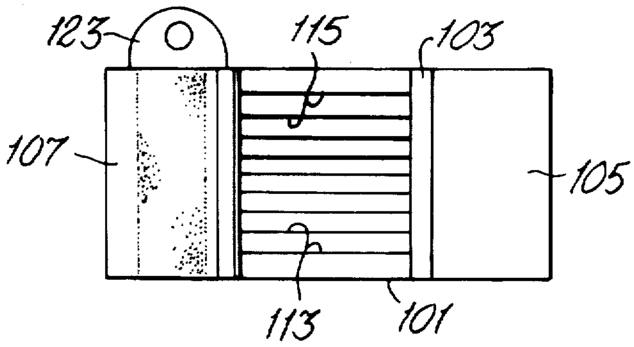
Figure 11:
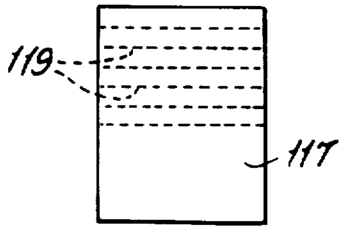
FIGS. 10 and 11 are, respectively, front and top views of a wedge member for use with the glazing clip shown in FIG. 7.
Figure 10:
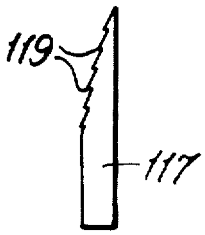

Each glazing clip 100 is conveniently formed of extruded plastics material such as polythene or polyethylene or polypropylene or polycarbonate and comprises a base portion 101 of generally rectangular outline, as seen in plan (FIG. 8). Where a double glazing unit of overall thickness of some 20 mm is to be supported the overall width, w, of the base portion may conveniently be of some 52 mm and the length, y, may conveniently be some 25 mm. Upstanding from the base portion 101 is a first glass-abutting portion 103 which is conveniently formed perpendicularly (or substantially so) to the base portion 101 at a locality spaced inwardly from one end portion of the base portion so as to provide a tongue 105. The glazing clip comprises a second glass-abutting portion 107 which extends inwardly at an angle of 45° (or substantially so) from the other end of the base portion 101. An outer, inclined, face 109 of the portion 107 is provided with a layer of pressure-sensitive adhesive for a purpose hereinafter described. An upper end portion 111 (as seen in FIG. 7) of the glass-abutting portion 107 is flexible and formed to provide a glass-engaging seal member. A mid portion of the base portion 101 is provided with inclined, stepped, wedge faces 113, 115 which, when the glazing clip is in use, lie adjacent to an edge face of the glass (or similar) panel to be supported by the glazing clip. Wedge members 117, one of which is shown in FIGS. 10 and 11, having stepped wedge faces 119 complementary to the faces 113 and 115 of the glazing clip may be driven between the edge face of the glass (or other) panel and the faces 113 and 115 to support the panel at the desired position with respect to the glazing clip and hence a frame member on which the clip is mounted, conveniently by a screw 121 extending through a lug 123 formed on the base portion of the glazing clip.

The glazing clips are secured (at appropriate intervals) along the upper surface of the inner frame member as shown in FIG. 6 so that their tongues 105 extend under the glass retaining member 9, the first glass-abutting portions 103 engage the outer face of a glass panel P and the second glass-abutting portions 107 engage the inner face of the panel. The inclined faces 109 provide support for the glazing strip 9' the base portion of which is tucked under the inner rib 11 and the pressure-sensitive adhesive on the faces 109 serves to secure the glazing strip in place. Wedges 117 driven in between the glass panel P and the wedge faces 113 and 115 of the glazing clip support the panel P in the desired position. Beads of sealing material 59 serve to seal the joints between the glass panel and the glass retaining member 9 and glazing strip 9'.

In assembling frame members into frames corner joints between adjacent frame members are preferably made in a manner which will now be described. Each frame member 201, 203 (represented in somewhat simplified form in FIG. 12) is provided with end faces 205 which, at a corner, are brought into abutting relationship along a plane represented by the dotted line 206 to form a mitre joint. Prior to assembly of the frame members a pair of slot-like cavities 207 is formed in each end of each frame member so as to extend through the inclined end faces 205, the cavities being spaced apart in a direction extending widthwise of the respective frame members as shown in FIG. 13. As will be seen from FIGS. 12 and 13 the slot-like cavities 207 are so formed that their lengthwise direction lies at least substantially parallel to a plane containing the two frame members when assembled together.

The cavities are so located in the frame members that each cavity in one frame member communicates with a corresponding cavity in the other frame member when they are brought together with their end faces 205 in abutting relationship. During assembly of the frame members there is introduced into each pair of communicating cavities a plate-like reinforcing member 211 having a plurality of apertures 212 extending therethrough, the reinforcing member preferably being formed from expanded metal sheet material. The outline shape of each reinforcing member is such that, when it is introduced into a pair of communicating cavities it is substantially co-extensive therewith (see FIG. 12). The abutting frame members 201 and 203 are then firmly clamped together while a settable plastics material 213 is injected into the communicating cavities 207 at least substantially to fill those cavities and enter the apertures 212 in the reinforcing member(s) 211 therein. On setting, the plastics material 213 (with reinforcing member 211 embedded therein) provides a bridging member which extends from the cavity in one frame member to the corresponding cavity in the adjacent frame member so as to secure the frame members together. The plastics material is injected into the cavities through a cross bore 214 extending through one of the frame members from an inside face 215 thereof. The cavities 207 are conveniently formed by drilling a series of at least substantially parallel bores through the end faces 205 of the frame members 201, 203 the axes of the bores forming the cavity through the left hand face 205 of the frame member 201 seen in FIG. 12 being indicated by the series of parallel dot-dash lines 209. The bores are arranged to overlap (see FIG. 13) to provide a ridged formation in the side walls of the cavity, some of the resulting ridges being indicated at 210 in FIG. 13. The ridges provide good keying with the plastics material on setting thereof in the cavities. The bores forming the cavity in an end portion of a frame member are drilled to a controlled depth so that they do not break through any outside surface of the frame member. While the bores may be drilled perpendicular to the inclined end face 205 of the frame member if desired, a cavity of greater depth (for a given size of frame member) can be obtained by drilling the bores in a direction inclined at an angle $\theta$ (FIG. 12) to a normal to that end face (the direction of the inclination being towards the lengthwise axis of the frame member), the angle $\theta$ preferably being in the range of from about 10° to about 30° to said normal. By drilling the bores at an angle as just referred to, rather than parallel to the lengthwise direction of the frame member, the result is achieved that the ridges 210 of the in the cavity walls extend somewhat obliquely with respect to the length of the frame member to increase the resistance to lengthwise withdrawal of the plastics material from the cavity.

Figure 12:
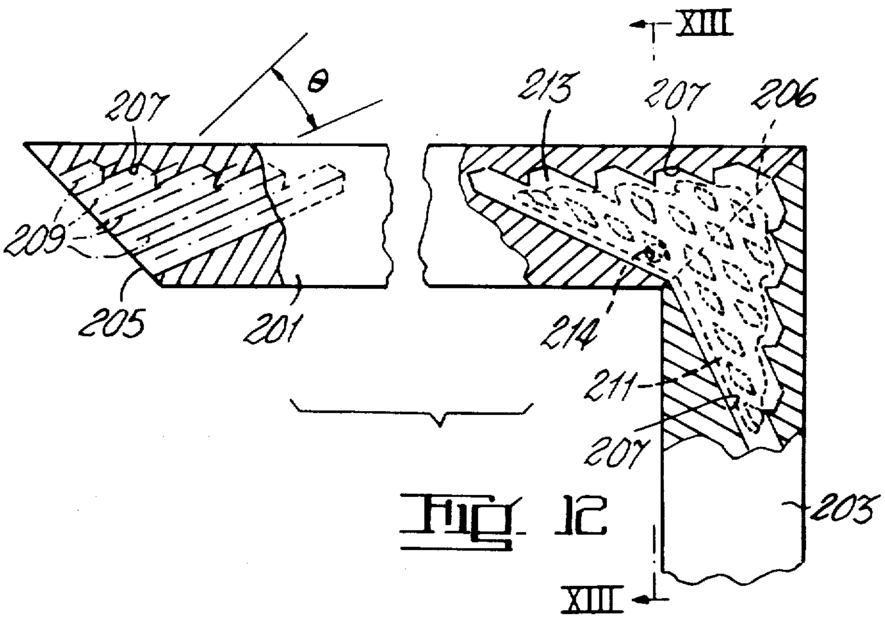
FIG. 12 is a detail view, partly in section and partly broken away, showing two frame members connected together by means of a first form of joint suitable for use in making frames in accordance with the invention.
Figure 13:
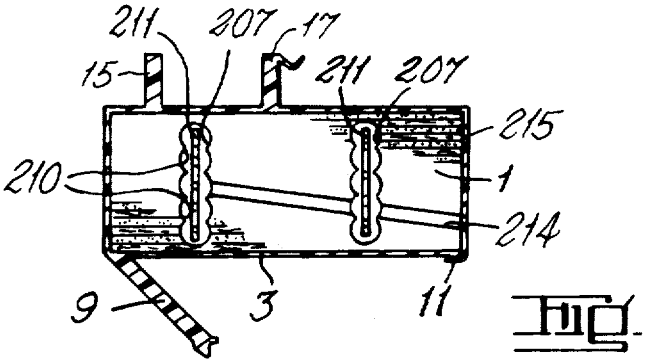
FIG. 13 is a section of the line XIII—XIII in FIG. 12 showing the location of cavities in one of the frame members, the frame member being of a more complex shape than that shown in FIG. 12.
Figure 14:
FIG. 14 is a plan view.
Figure 15:
FIG. 15 is an end view, of a reinforcing member used in making the joint shown in FIG. 12.
Figure 16:
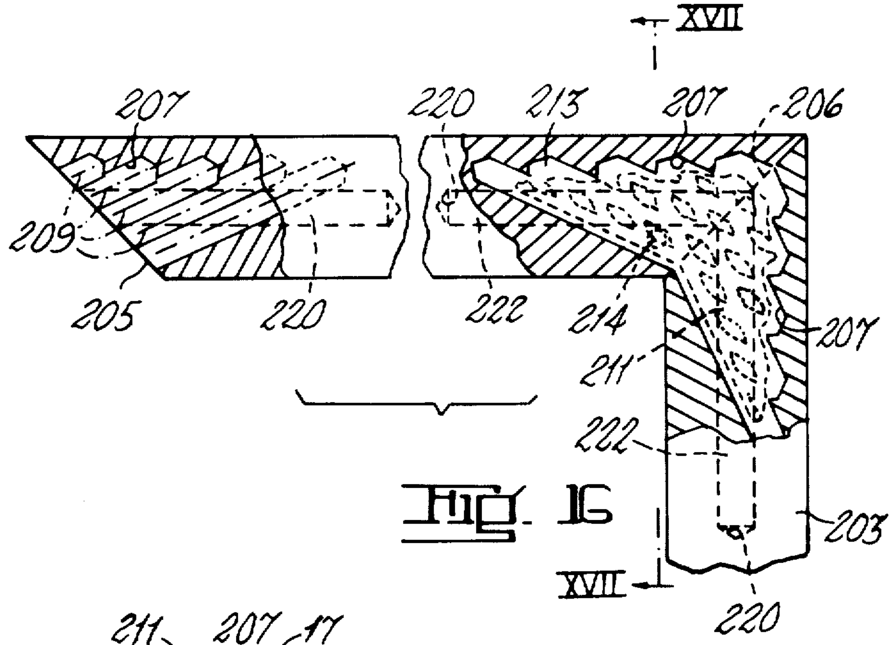
FIG. 16 is a view, generally similar to FIG. 12, but showing a second form of joint suitable for use in making frames in accordance with the invention.
Figure 17:
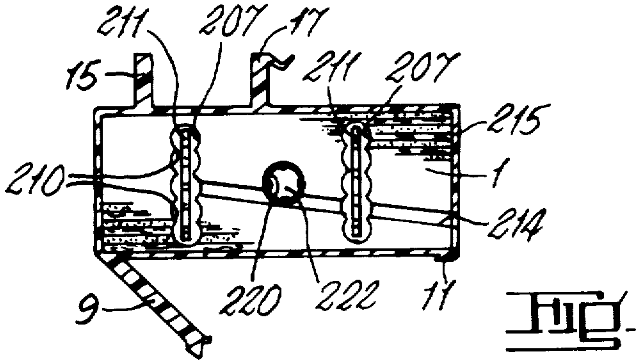
FIG. 17 is a section on the line XVII—XVII in FIG. 16, but again showing a frame member similar to that of FIG. 13.

While the form of corner joint shown in FIGS. 12 and 13 is likely to be adequately strong for many applications, a modified form of joint, shown in FIGS. 16 and 17, may be provided where even greater resistance to breakage is desired. In the modified form of joint each of the two frame members forming the joint is provided, additionally to the cavities 207, with a cavity 220 extending through its end face 205 in a direction lengthwise of the frame member so that, when the frame members are assembled, the additional cavities 220 communicate and are provided with an L-shaped reinforcing member 222 of somewhat less cross-sectional area than the cavities 220, settable plastics material is injected into the cavities 220 to fill the space remaining between the reinforcing member and the cavity walls. By arranging the cross bore 214 to communicate with each of the cavities 207 and 220 (see FIG. 17) the plastics material may be injected into all the cavities at a joint simultaneously.

While any plastics material capable of being rendered fluent for injection into various cavities and settable to produce bridging members of the required strength and durability may be used in carrying out a method in accordance with the invention Nylon may be quoted as an example of a suitable plastics material. Furthermore, in assembling the frame members to form a joint the abutting faces 205 may be coated with adhesive further to strengthen and seal the joint.

Figure 18:
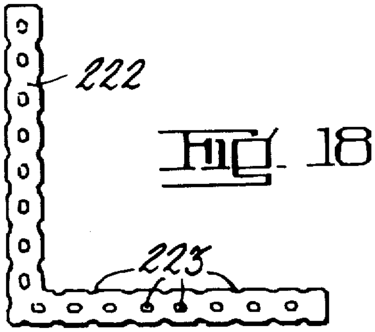
FIG. 18 is a side view.
Figure 19:
FIG. 19 is an end view, of an additional reinforcing member used in making the joint shown in FIG. 16.

The cavities 220 are conveniently provided by drilling a single round bore into each frame member and the reinforcing member 222 (see particularly FIGS. 18 and 19) conveniently comprises a piece of steel rod provided with surface indentations 223 to provide good keying with the plastic material. Corner joints in the form shown in FIGS. 16 and 17 are considered to be particularly suitable when profiles having cores of cement-bound fibrous material are used since the frames made therefrom are likely to be considerably heavier than when made from profiles cored with plywood. Joints of this form are likely to be particularly resistant to opening or coming apart in use, in view of the fact that any tendancy for separation to occur parallel to the lengthwise dimension of a frame member (i.e. by movement parallel to a limb of the reinforcing member 222) is resisted by the action of the reinforcing members 211 and associated plastics material in the ridged bores (inclined to said lengthwise dimension) providing the cavities 207 and vice versa. It may be pointed out that while the profiles having cores of cement-bound fibrous materials are likely to be considerably heavier than equivalent profiles having plywood cores, it is likely that they will be considerably cheaper to produce, thus enabling a further economy in manufacture of frames therefrom to be achieved.

It will be appreciated that when the static and opening frames are arranged with the flanges 15, 17 and 15', 17' positioned as indicated in FIG. 4 the opening frame may be top hung or side hung. Alternatively side pivot stay hinges may be used in which case the opening frame is arranged to move bodily outwards as it swings about a virtual transverse pivot so that the window moves towards a substantially horizontal position to facilitate cleaning. In this case the special stay hinges are housed within the spaces provided between the flanges 15 and 15', the flanges 17 and 17' being slotted where necessary. The adjacent flanges 17 and 17' are provided with sealing strips 61 (see also FIG. 1) of flexible PVC which are compressed when the window is closed to provide draught proofing. These sealing strips may be formed and attached to the flange 17 during extrusion of the profile (as in the case of the sealing strip 45 above referred to).

Figure 9:
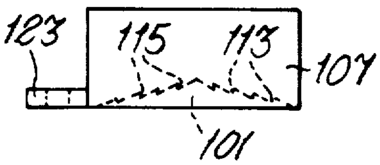
FIGS. 8 and 9 are, respectively, plan and front views of the glazing clip shown in FIG. 7.

If the window frame is to be of the simple transverse pivot hinged type the static frame members may be reversed with the flanges 15' and 17' positioned opposite the flanges 15 and 17 in which case the side frame members are separated to a greater extent to accomodate the pivot hinges and the flanges 17 are arranged to close against stop members formed in part on the static frame and in part on the moving frame in well known manner. The arrangement shown in FIG. 6 shows a "side-opening" hinge 157. Also shown in FIG. 6 is a sill member 149 fixed to the static frame 42 by means of metal or other brackets 151, the joint between the sill member and the frame being sealed at 153.

Where a frame is to be glazed with a single pane of glass a different spacing is required between the panel retaining member 9 and the glazing strip 9', in which case the profile may be provided with an undercut rib generally similar to the rib 11 (see FIG. 1) but located at an intermediate position of the upper surface of the profile approximating to the location of the intermediate rib 13 shown in that Figure. Glazing clips of the form shown in FIGS. 8 and 9 may be used with such a profile with the spacing between the glass-abutting portions 103, 107 suitably changed.

I claim:

1. A method of manufacturing frames for windows from a cored extruded plastics profile for use in the manufacture of frames for panels including windows comprising a core of shape retaining material and a cladding of plastics material extruded therearound characterized in that the core (1) is of generally rectangular cross-sectional shape and in that the cladding (3) provides (a) along one surface of the profile at a locality adjacent one edge of said surface a retaining member (9) for a panel, which retaining member extends inwardly over said surface and is inclined at an angle thereto and (b) along said surface of the profile at a locality spaced from the retaining member, a rib (11) having an undercut face (23) inclined to said surface at an angle at least substantially corresponding to the angle of inclination of the retaining member (9), the retaining member being severable from the profile to form the profile into an outer frame (42) and being utilized as glazing strips (9') in the manufacture of a corresponding inner frame (40), the glazing strips (9') being arranged after insertion of a panel, to abut against the undercut face (23) of the rib (11) of the profile and to be supported by the supporting members (47) mounted on said surface of the profile, the method comprising the steps of feeding an indefinite length of the profile past sawing means organized to make a series of transverse cuts (31, 32, 33, 34, 35, 36, 37, 38, 39) at 45° across the profile so as to sever therefrom successively frame members (A, E, B, F, C, G, D, H,) of appropriate lengths for assembly alternately into an outer static frame (42) and an inner opening frame (40) for a window, severing the panel-retaining members (9) from those frame members (E, F, G, H) which are to be assembled into the outer frame (42), assembling the alternate frame members (A, B, C, D and E, F, G, H) to form said inner frame (40) and said outer frame (42), and after cutting the retaining members (9) severed from the frame members (E, F, G, H) for the outer frame to appropriate lengths, utilizing them as glazing strips (9') in assembling said inner frame (40) with a panel.

2. A method in accordance with claim 1 characterized in that the glazing strips (9') are arranged to abut against the undercut face (23) of the rib (11) of the profile and to be supported by supporting members mounted on the said surface of the profile, said supporting members being provided by glazing clips each comprising a base portion (101) adapted to be secured to said surface of the profile, a first panel-abutting portion (103) arranged to extend at least substantially perpendicular to the base portion (101) for engagement with one side of the panel and a second panel-abutting portion (107) which extends from an end portion of the base portion (101) inwardly thereover for engagement with the other side of said panel, said second panel-abutting portion (107) providing a supporting surface (109) for the glazing strip (9').

3. A method in accordance with claim 2 characterized in that each glazing clip is so constructed that the first panel-abutting portion (103) is spaced inwardly from an adjacent end portion of the base portion (101) so as to provide a tongue (105) which extends under the glass, or other, panel retaining member (9) of the profile.

4. A method in accordance with claim 2 characterized in that each glazing clip is so constructed that a mid portion of the base portion (101) is provided with inclined, stepped, wedge faces (113, 115) which are adapted to lie adjacent to an edge face of the glass, or other, panel and are arranged to co-operate with wedge members (117) having complementary stepped wedge faces (119) which may be driven between said edge of the panel and the stepped wedge faces (113, 115) of the glazing clip to support the panel at a desired position with respect to the profile.

5. A method in accordance with claim 4 characterized in that the glazing clips are formed of extruded plastics material, for example, a polythene, polyethylene, polypropylene or polycarbonate.

6. A method in accordance with claim 5 characterized in that the glazing strips (9') are secured to said surfaces (109) of the glazing clips by means of adhesive.

7. A method in accordance with claim 1 characterized in that the profile includes a rib portion (19), bead (21) and intermediate rib (13) as claimed in claim 11, and in that the glazing strip (9') are arranged, after insertion of glass, or other, panel, to abut against the undercut face (23) of the rib (11) of the profile and to be supported by glazing clips (47) each comprising a pair of leg portions (51) adapted to clip over the intermediate rib and a pair of arm portions (53) providing between them a semi-cylindrical recess (57) adapted to clip around the bead (21') of said glazing strip.

8. A method in accordance with claim 1 characterized in that said transverse cuts (31–39) provide the frame members with inclined end faces (205) which, in forming a corner joint between two adjacent frame members are brought into abutting relationship, the corner joint being made by (a) drilling two series of at least substantially parallel bores (209) through the inclined end faces (205) of the frame members, the bores in each series being arranged to overlap, to provide a pair of slot-like cavities (207), having walls with ridges (210) extending into each frame member through its inclined end face (205), the cavities of each pair being spaced apart in a direction extending widthwise of the respective frame members, the lengthwise direction of each slot-like cavity (207) lying at least substantially parallel to a plane containing the two assembled frame members, and the cavities being so located that a cavity in one frame member communicates with the corresponding cavity in the other frame member when the frame members are held in abutting relationship, (b) placing in each pair of communicating cavities (207), during assembly of the frame members, a plate-like reinforcing member (211) having a plurality of apertures (212) extending therethrough, and (c) injecting into said cavities (207) a settable plastics material at least substantially to fill those cavities and enter the apertures (212) in the reinforcing member (211) therein, so as to provide, on setting of the plastics material, a bridging member extending from a cavity in one frame member to the corresponding cavity in the adjacent frame member so as to secure the frame members together.

9. A method in accordance with claim 8 characterized in that each reinforcing member is formed from expanded metal sheet material.

10. A method in accordance with claim 8 characterized in that the bores (209) are arranged to extend into each frame member in a direction inclined to a normal to its end face (205) at an angle in the range of from about 10° to about 30°.

11. A method in accordance with claim 8 characterized in that each of the two frame members associated with the joint is provided additionally with a cavity (220) extending through its inclined end face (205) in a direction lengthwise of the frame member so that, when the frame members are assembled, the lengthwise extending cavities (205) communicate and are provided with an L-shaped reinforcing member (222) of less cross-section area than the cavities in which it is received, and wherein plastics material is also injected into the additional cavities (220).

12. A method in accordance with claim 11 characterized in that the L-shaped reinforcing member (222) is in the form of a rod provided with surface indentations (223) to provide a key for the plastics material.

13. A method in accordance with claim 11 characterized in that plastics material is injected into each cavity (207, 220) at a joint through a bore (214) communicating with the cavities, said bore (214) extending through an inside face of one of the frame members.

14. A method in accordance with claim 8 characterized in that the plastics material comprises nylon.

15. A method of manufacturing frames for windows and the like from a profiled strip of indefinite length having a core of shape retaining material and a plastics cladding around the core and provided on one face with a panel retaining member which extends angularly upward from the face and inward toward the middle of the face, characterized in that said method comprises cutting the strip into sections alternately diverging and converging at 45° angles across the strip, said sections being of suitable lengths for forming an outer static frame and an inner panel holding frame sized to fit within the outer frame, severing the panel retaining members lengthwise along the face of the sections for forming the outer frame, assembling the outer frame into a rectangular shape with the angular cuts forming miters at the abutting corners, assembling the inner frame in a rectangular shape so the angular cuts form miters at the abutting corners, inserting a panel centrally in the inner frame against the retaining members, and securing the severed panel retaining members on said face of the inner frame as glazing strips in opposed relation to the unsevered panel retaining members to retain the panel.

* * * * *